March 27, 1928. 1,663,978
S. M. FRIEDE ET AL
MATCH SPLINT MACHINE
Filed Jan. 15, 1926 8 Sheets-Sheet 3

March 27, 1928.

S. M. FRIEDE ET AL 1,663,978

MATCH SPLINT MACHINE

Filed Jan. 15, 1926

Inventors,
Samuel M. Friede, and
Charles Hakemeyer,
By their Attorney,
W. B. Hutchinson.

Patented Mar. 27, 1928.

1,663,978

UNITED STATES PATENT OFFICE.

SAMUEL M. FRIEDE, OF NEW YORK, N. Y., AND CHARLES HAKEMEYER, OF PATERSON, NEW JERSEY, ASSIGNORS, BY MESNE ASSIGNMENTS, TO AMERICAN SAFETY MATCH CORPORATION, OF NEW YORK, N. Y., A CORPORATION OF DELAWARE.

MATCH-SPLINT MACHINE.

Application filed January 15, 1926. Serial No. 81,479.

Our invention relates to improvements in match splint machines of the kind used in cutting match splints or sticks from veneer stock which is prepared in long lengths, with the thickness corresponding to the desired thickness of the splint, and with the width corresponding to the length of the splint. It is an almost universal practice now to impregnate match splints in a solution which prevents them from coaling and dropping coals, and in the usual practice where splints are cut from veneer, the splints are cut green, delivered en masse into an impregnating tank, then put through a drier, then cleaned, and finally straightened and either packed or inserted in a dipping machine which puts the firing composition on the ends of the splints. These various operations entail a great deal of handling of the splints, which is expensive, and a most serious objection is that in the various handlings many splints are destroyed, broken, or in some way lost. This is very important now because timber has become so expensive. The object of our invention is to produce a machine which will cut out many of the operations, will simplify the handling of the stock during its process of manufacture into splints, and will deliver better splints ready for packing or dipping.
In consonance with this idea we have evolved a machine which carries out the continuous process, that is the strips of veneer are first cut off square, then carried forward while still in the strip through an impregnating bath, then through means for getting rid of the surplus water and resinous matter, and forcing the impregnating solution well into the stock, then drying thoroughly the veneer strips or stock, then cutting it into splints and at the same time blowing away the slivers and dust, and finally straightening the splints in trays ready to be inserted either in a match dipping machine or in a packing case as desired. In carrying this operation into effect, our invention is adapted to do all the aforesaid work without any handling except to direct the veneer stock into the machine and take away the finished splints. Furthermore, it is desirable to have the splints cut square in order that they may make a good apperance when in the match, and our invention is adapted to cut a better splint than those cut in the ordinary ways.

Our invention is also intended to provide an improved splint receiving magazine which oscillates in two directions, and which is constructed and arranged so that the splints will be quickly and nicely straightened in their receiving trays, and furthermore, to arrange the hopper which delivers the splints to the receiving trays or magazines so that it can be shifted to discharge the splints into either magazine, to the end that one magazine may be filled while the other is being emptied. The foregoing and other advantages will appear from the description which follows.

Reference is to be had to the accompanying drawings forming a part of this specification, in which similar reference characters indicate corresponding parts in all the views.

Figure 1ª is a broken side elevation of the discharge end of the machine, being a continuation of Figure 1.

Figure 2ª is a plan view of the discharge end of the machine.

The drawings are by way of example and show a preferred and practical means of carrying our invention into effect, but it will be understood that in a machine of this character many of the elements are themselves old, and other equivalent things can be substituted for them; but the important thing is the general organization and arrangement of parts, though some of these are claimed in detail. Many parts can be substituted for those shown, however, without affecting the invention.

Match splints of the kind referred to are usually cut from veneer stock 10 which comes in the form of sheets, the width corresponding to the length of the match splint 11, and the thickness corresponding to the thickness of the splint, and the strips are cut into splints which are ultimately made into matches. These strips in the factory usually come in the form of rolls 12, although the strips can be used in the machine if not rolled, and in practice the strips which are not rolled are fed through the machine precisely as they are fed from the roll. The greater part of the stock comes rolled, however, and the rolls 12 can be conveniently mounted on a spindle 13 which is carried by a suitable supporting bracket 14, the latter being attached to one of the uprights 15 which support the greater part of the machine body or bed, and obviously can be of any suitable or preferred design.

As the stock is fed into the machine it is pushed over the table 16 which is mounted on a suitable support 17, and which has guideways 18 to keep the stock straight. The forward edges of the stock are pushed beneath knives 19 so that they may be cut off square and prevent any slivered splints from being cut. This is not usual in splint machines. The knives 19 can be operated in any convenient way, and other knives can be substituted, but as shown the knives are guided in a supporting bracket 20, and each knife has a shank 21, and is normally raised by a spring 22 arranged between the button 23 on the top of the shank and the top of the bracket 20. As the front edge of the stock comes beneath the knife 19, the latter is pushed down so as to square the stock, and the sliver drops out of the way.

Figure 1:
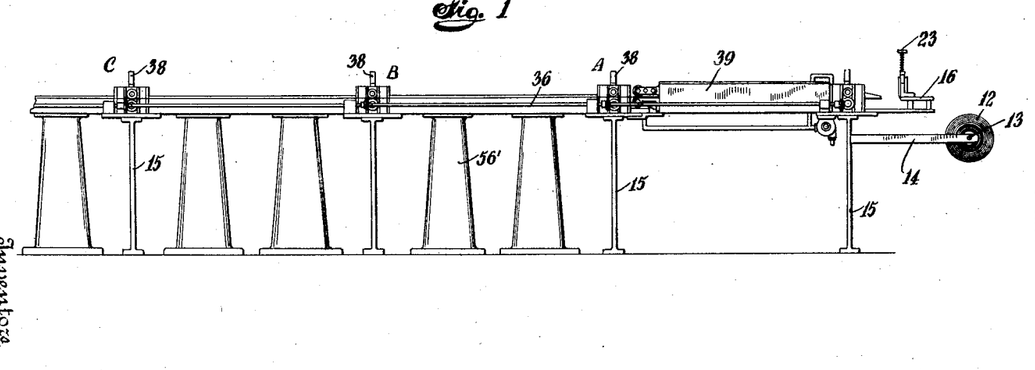
Figure 1 is a broken side elevation of one end portion of the machine, being the end in which the stock is inserted.
Figure 1A:
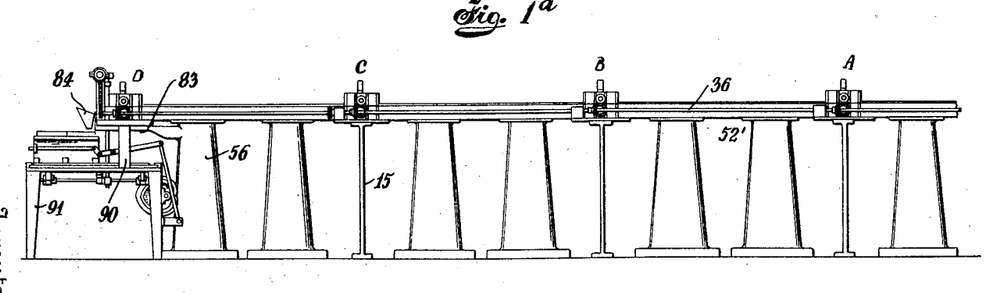
Figure 2:
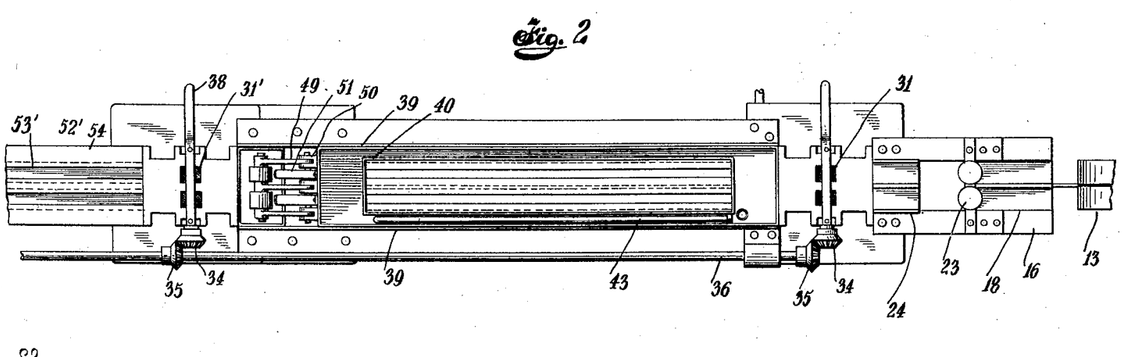
Figure 2 is a plan view of the front end of the machine.
Figure 2A:
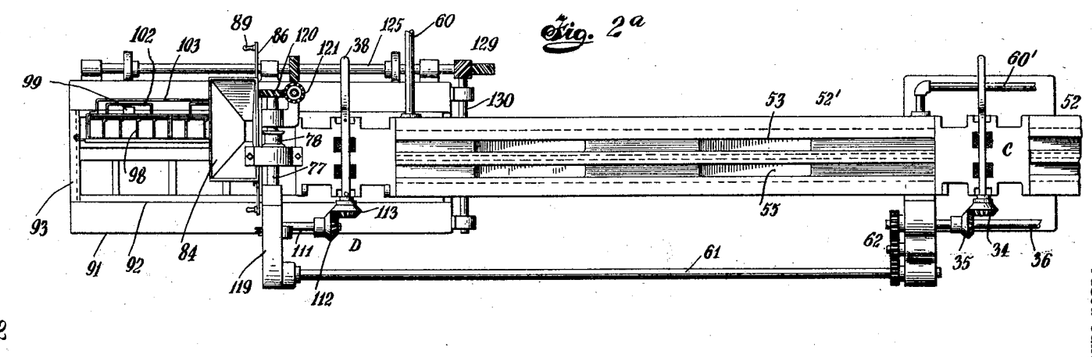
Figure 3:
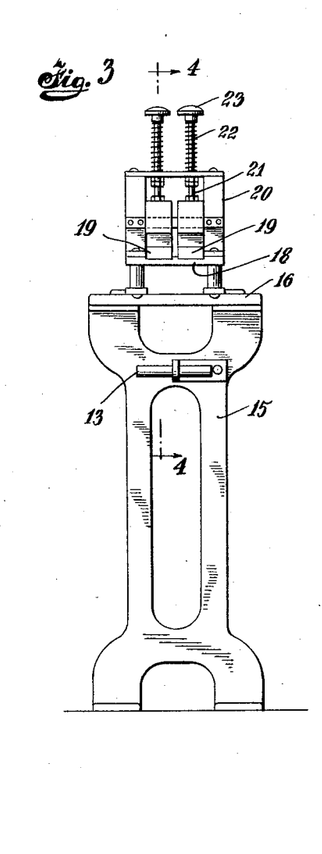
Figure 3 is an end view of the front or receiving end of the machine.
Figures 4, 5:
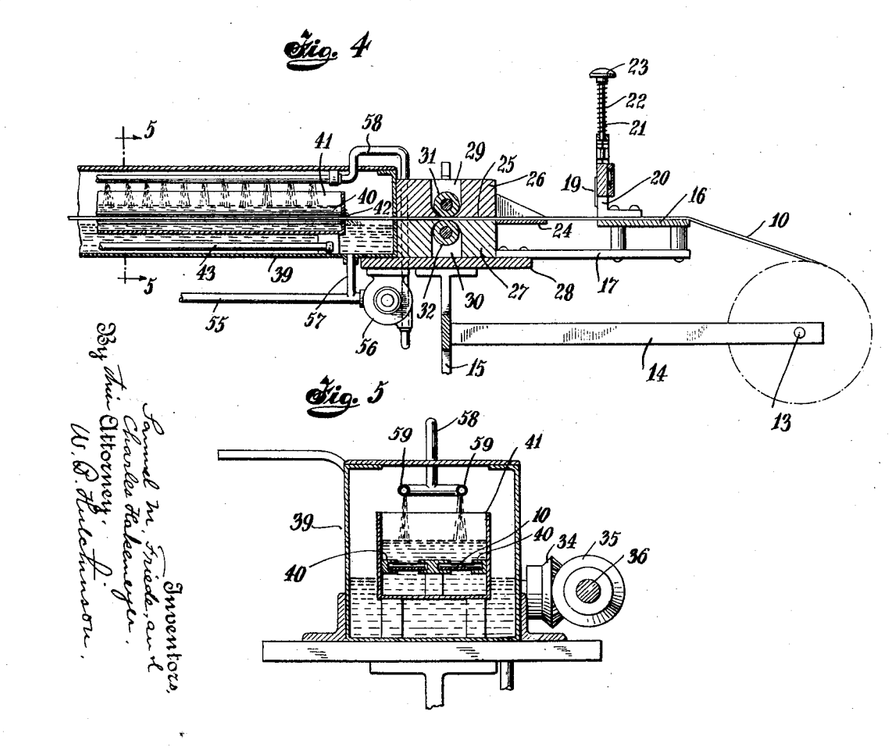
Figure 4 is a broken section on the line 4—4 of Figure 3.
Figure 5 is a cross section on the line 5—5 of Figure 4 taken through the impregnating tank or bath.
Figures 6, 7, 8:
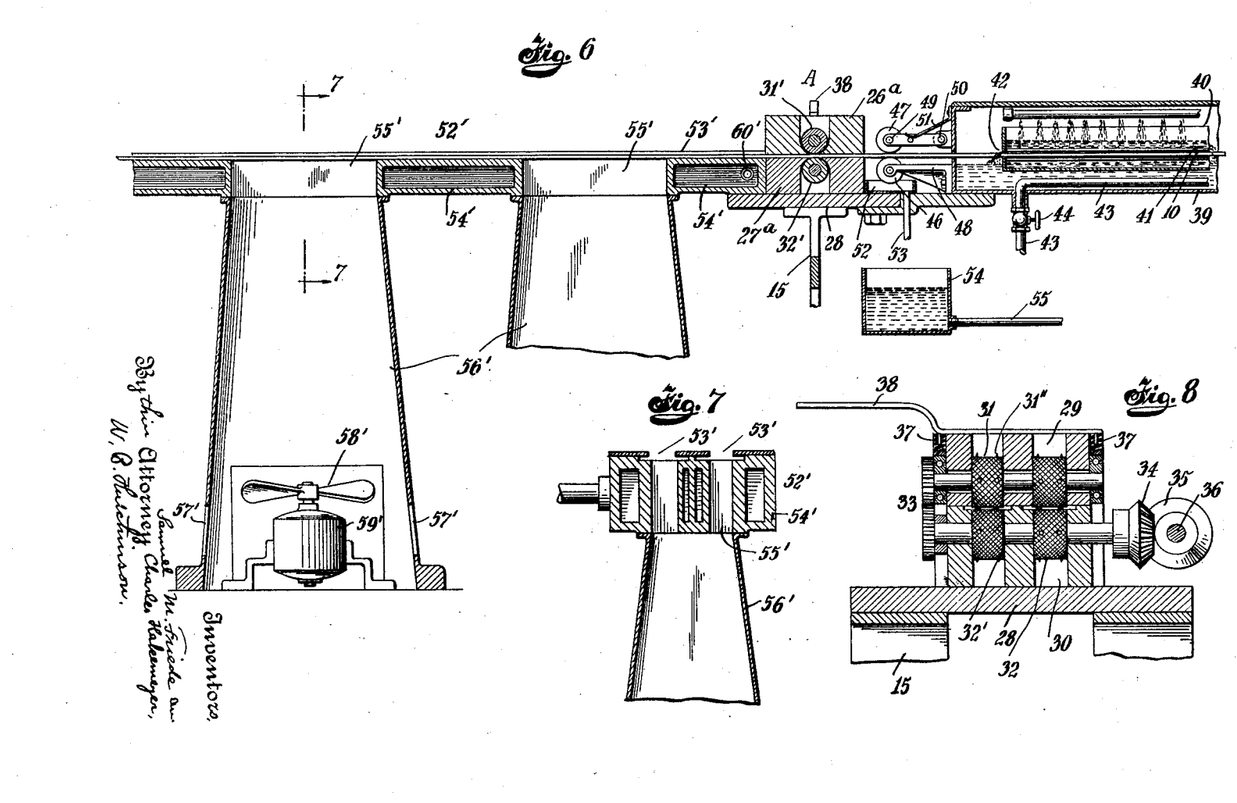
Figure 6 is a broken enlarged detail longitudinal section showing particularly the means for discharging the stock or veneer from the impregnating bath, wringing and drying the stock.
Figure 7 is a cross section on the line 7—7 of Figure 6.
Figure 8 is a cross section showing the arrangement of the feed rolls for feeding the stock.

After being squared the stock is entered in the guide chutes 24 and inserted in the guide-ways 25 which are formed between the upper and lower blocks or members 26 and 27, these being supported one above the other on a bed 28, and the latter being carried by one of the supports 15. The members 26 and 27 are recessed as shown at 29 and 30 to provide for the feed rollers 31 and 32 which are arranged in a general way after the usual manner of feed rollers, and the shafts of the upper and lower rollers are geared together as shown at 33 in Figure 8. The rollers can have brads $31^a$ thereon to better grip the stock. This construction is also shown clearly in Figure 4. The feed rollers can be driven in any suitable way, but we have shown the shaft of the lower rollers 32 connecting by miter gears 34 and 35 with a shaft 36 which runs longitudinally along one side of the machine and drives the several feed rollers which will be hereinafter referred to. In this connection it will be noticed that the construction just described and shown in Figures 4 and 8 is typical of the several sets of these rollers, so that the description of one set answers for all. The upper member 26 which carries the upper feed rollers 31 is removable, as the upper rollers must be floating rollers in order to provide for variation in veneer thickness and to prevent clogging in case some extraneous matter runs between the rollers. To this end the boxes of the upper rollers are pressed by springs 37, and the member 26 is provided with an arm 28 by which it may be tilted or raised.

After the stock leaves the first pair of these rollers 31 and 32, it is forced still in its strip form, into the tank 39. This contains a suitable impregnating solution such as a solution of ammonium phosphate, to cause the match splints when cut to burn without coaling and without dropping coals. As applied to our improvements the tank is disposed so as to keep the solution circulated and stirred, properly heated, and particularly so that the stock will be carried through flat and straight without bending, as the stock is sometimes brittle and easily broken. The tank is therefore a double tank comprising a main tank part 39 and a pan 41 supported in the tank above the normal level of the liquid, this pan having tracks 40 therethrough to guide the stock 10 and hold it flat and straight. The pan is slotted at the ends as shown at 42 to regulate the stock, and the main tank is also provided with suitable end slots for the passage of the stock. The solution can be kept warm in any convenient way, and we have shown a steam pipe 43 (see Figures 4 and 6) entering the tank and controlled by a valve 44. As the stock leaves the tank (see Figure 6) it passes between the wringing rollers 46 and 47 which are placed above and below the stock so as to impinge upon it, the lower roller being mounted in a bracket 48, and the upper roller being pivoted in a bracket 49 which is pivoted as at 50 and is pressed down by the spring 51. These wringing rollers serve to squeeze the surplus liquid from the stock and also force the liquid well into it so as to afford better impregnation. The liquid which is squeezed from the stock falls into the pan 52, and from this passes out through a pipe 53 to a tank 54, the latter having a pipe 55 which connects with a pump 56 (see Figure 4) and the pipe 55 also has a connection with the tank 39 through the pipe 57, while the liquid passing from the pipe 55 through the pump 56 is discharged through the pipe 58 and branch pipes 59 (see Figures 4 and 5) into the pan 41. The object of the pipe 57 is to provide for circulation in case there is not much liquid in the tank 54.

The liquid supplied to the pan 41 overflows the pan and flows out through the slots 42 and is thus kept thoroughly circulated, and distributed to the stock 10 in condition for quick action. After leaving the tank the stock is held flat and dried as quickly as possible, and attention is here called to the fact that in impregnating the stock in sheet form and drying it quickly, several advantages over the ordinary practice are obtained. First the stock is not immersed for any great length of time and is quickly dried so that it is whiter than when the splints are treated in the ordinary way. Further, the method of immersing, wringing, and quickly drying the stock while flat, seems to affect the resinous qualities of the stock, so that cheaper woods can be used than where the usual practice is followed of cutting the sticks or splints and then dipping and drying them.

It is essential to keep the stock flat and straight so that it will not warp or twist throughout the process, and therefore after leaving the immersing tank it is carried over the flat drier 52' to the cutter. In this connection attention is called to the fact that the arrangement of blocks 26, 27, 26', 27', 26ᵃ and 27ᵃ, with their feed rollers 31', 32', are disposed at necessary intervals along the machine, as at A, B, C and D. It is not, therefore, necessary to describe each set of rolls. The drier 52' has a flat top with tracks 53' to guide the stock, and the drier has a steam chamber 54' extending throughout its length, and at intervals vertically through the drier are air flues 55' through which air is blown from the pipes 56' arranged below the drier. We find it advantageous to have the air blown across and through the stock so as to quickly carry away the vapor. The several pipes 56' have air openings 57' near the bottom, and each is provided with a fan 58' operated by a motor 59' or equivalent (see Figures 6 and 7). These independent air forcing devices are arranged all along the under side of the drier, and while the air might be forced through in other ways, it is an advantage to have independent air supplying units, as owing to the differences in stock and atmospheric conditions, it is sometimes desirable to use all of them, while at other times a part of them suffices. The steam is supplied and exhausted to and from the chamber 54 by the pipes 60 and 60'.

Figure 9:
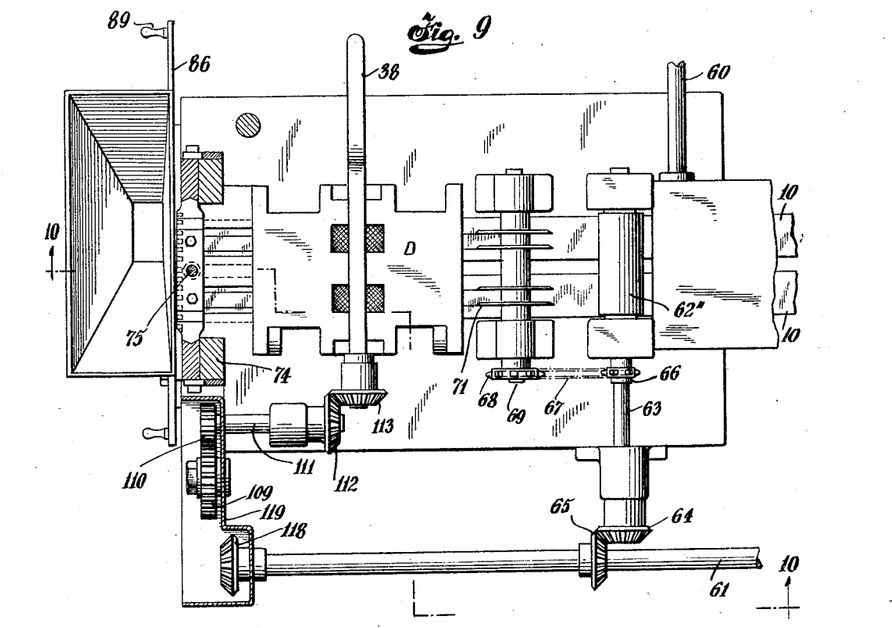
Figure 9 is a plan view partly in section of the rear or discharge end of the machine.
Figure 10:
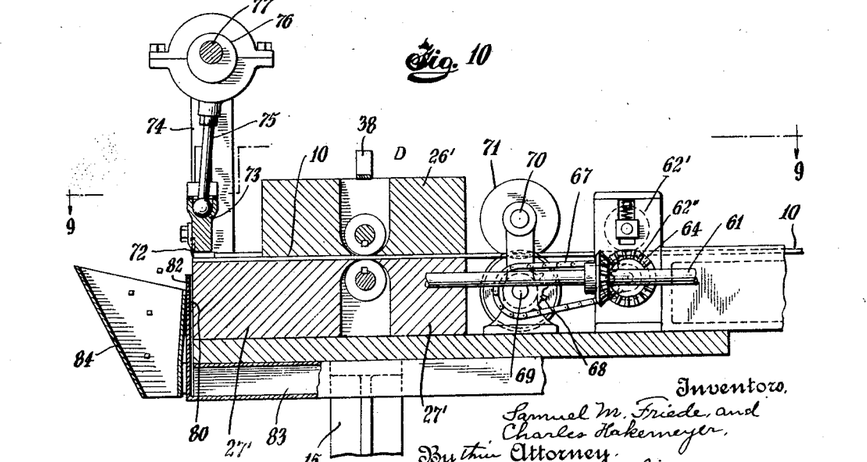
Figure 10 is a section on the line 10—10 of Figure 9.
Figures 13, 14, 15:
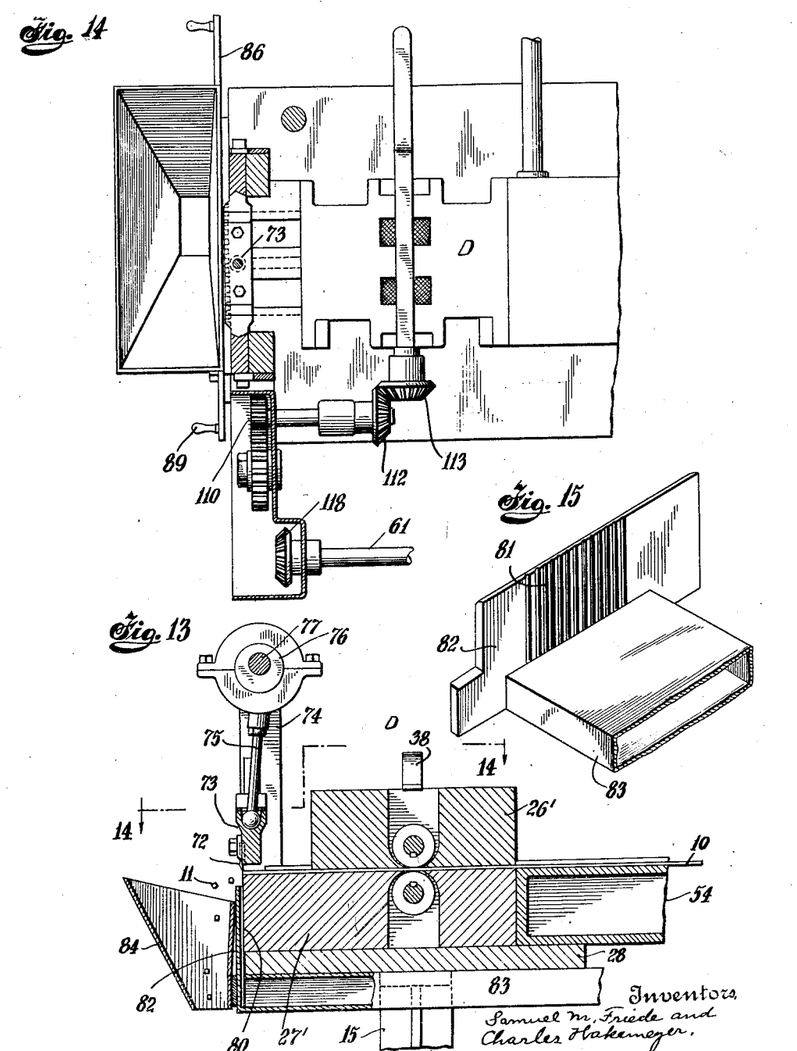
Figure 13 is a view similar to Figure 10 but showing a modification.
Figure 14 is a section on the line 14—14 of Figure 13.
Figure 15 is a broken enlarged detail view illustrating the means for blowing the finely divided parts away from the splints as the latter are cut.

After passing the drier the stock is buffed if desired, slitted if necessary, and cut into splints. As a matter of convenience we have shown along the end of the machine a shaft 61 which is really an extension of the shaft 36 and is connected to it by gears 62 (see Figure 2ᵃ). After leaving the drier the stock can if desired be buffed to make it very smooth, and a convenient way is to pass it between the buffing rollers 62' and 62" (see Figures 9 and 10), and these can be driven in any suitable way. We have shown them as having the shaft 63 of one connected with the shaft 61 by gears 64 and 65, and the rolls can be geared together as usual, as for example like the feed rolls 31'—32'. If each stock strip is wide enough to make several match strips, they can be slitted to make a plurality of such strips, and to this end, as in Figures 9 and 10 we have shown the shaft 63 provided with a sprocket wheel 66 and connecting with a chain 67 with the sprocket wheel 68 on the shaft 69 working in conjunction with a shaft 70, the latter carrying slitting discs 71 to operate with similar members on the shaft 69, and thus slit the stock. This arrangement is not described with great detail, because it is a common slitting device, and some other type can be substituted for it if desired. If the stock strips 10 as they leave the drier are each of a width to be cut into splints, it is not necessary to use the slitter, and in Figures 13 and 14 I have shown the cutting mechanism used without either slitters or buffers. In this case the stock is delivered directly from the final blocks 26', 27' which are similar to the corresponding parts in Figures 9 and 10, and are like those already described except that the lower block is slightly prolonged as shown in Figures 10 and 13 for convenience of cutting. The stock as it is pushed over the edge of the block 27' is sheared into splints by the rapidly reciprocating knives 72. Other types of cutters can be used, but we prefer to use the reciprocating cutters as they cut the matches square and smooth, which is desirable.

Figure 11:
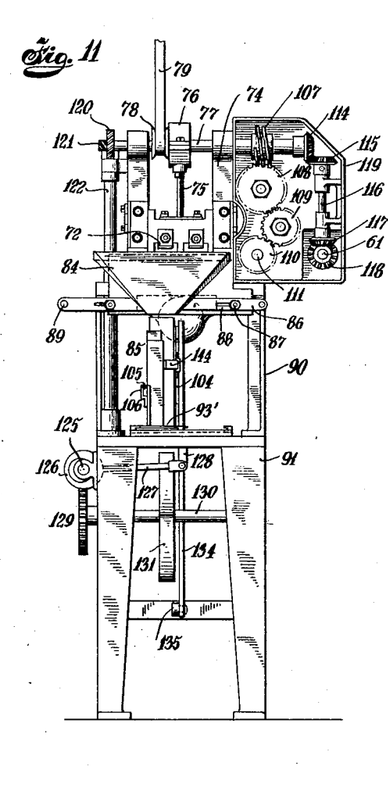
Figure 11 is an end view looking at the discharge end of the machine.

In the type of cutter shown the knives are secured to the cross head 73 which slides up and down in the guide frame 74, and the cross head connects by a link 75 with an operating eccentric 76 on the shaft 37 which is journaled in the top of the frame 74, and can be driven in any suitable manner as for instance by a pulley 78 and belt 79 (see Figure 11). To provide for clean splints without dust and slivers, the end of the block 27' (see Figures 10 and 13) is provided with vertical grooves 80 widest at the bottom and inclined towards the top which discharge near the knives 72 and register with corresponding grooves 81 in a face plate 82 which is attached to the block 27' so that as the splints are cut the blast of air which is supplied through the flue 83 connecting with one of the pipes 56' or other source of air, blows the dust and slivers away and permits the splints 11 to drop into the hopper 84 which is open at the bottom. This air blast can be regulated so as to have sufficient force to blow away the dust and slivers which are small and light, without blowing away the splints 11.

Figure 16:
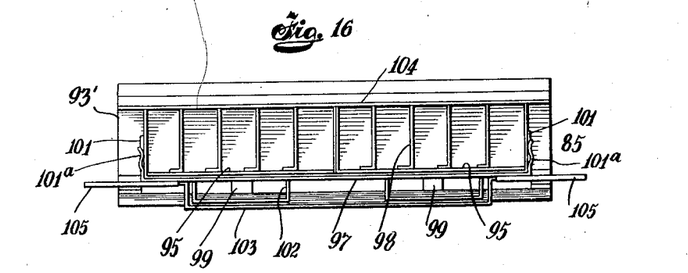
Figure 16 is a plan view of the splint receiving magazine and shaker.
Figure 17:
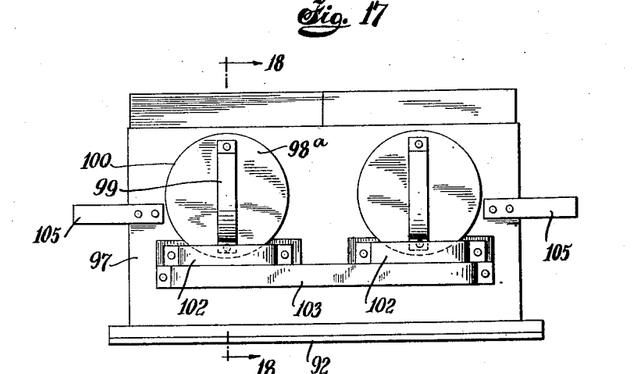
Figure 17 is a side elevation of the structure shown in Figure 16.
Figures 18, 19:
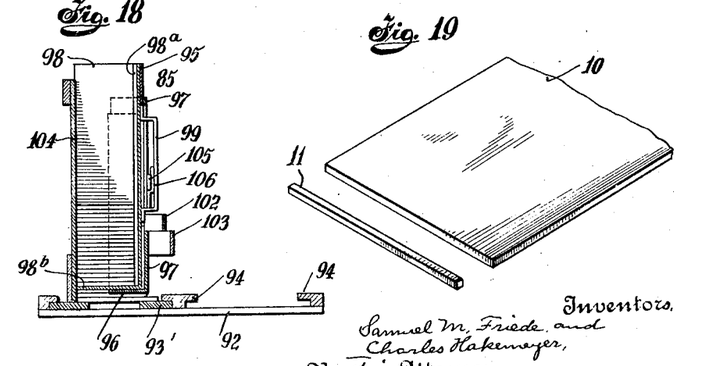
Figure 18 is a cross section on the line 18—18 of Figure 17.
Figure 19 is a broken perspective view of the veneer stock and a splint separated therefrom.

From the hopper 84 the cut splints are delivered into straightening and retaining magazines 85 (see Figures 16 to 18). These magazines are arranged side by side, one being filled while the other is being taken away and emptied, and to this end the hopper 84 is made to slide laterally to bring it over either magazine, as best shown in Figure 11. The side adjustment is easily obtained in the manner illustrated, in which the hopper is supported on a slide bar 86 which moves on bolts 87 entering slots 88 in the slide bar. The bar can be provided with suitable handles 89 at its ends, and thus by one of the handles the hopper can be easily moved to register with a desired magazine. The cutting mechanism is supported on uprights 90, and these are attached to the table 91 forming a continuation of the main machine, but obviously the frame structure is unimportant.

Figure 12:
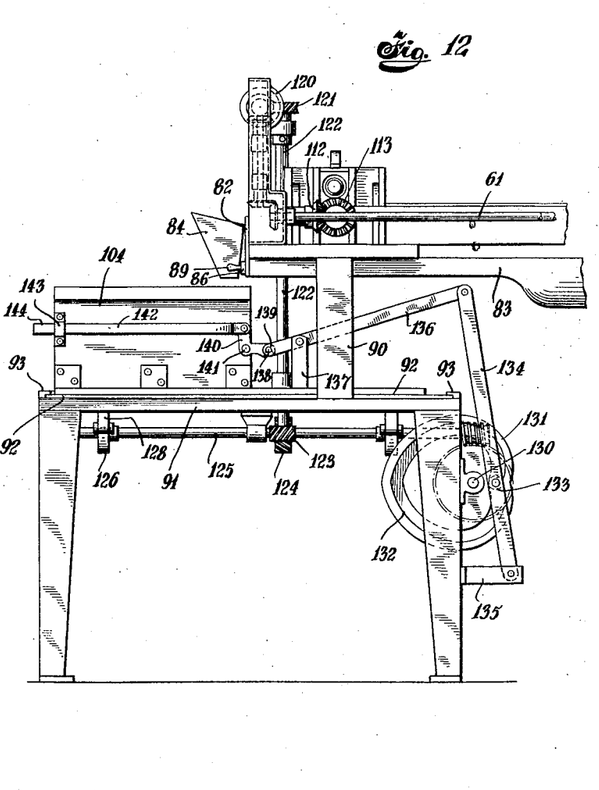
Figure 12 is a side elevation of the discharge end of the machine.

The magazines 85 into which the splints are delivered by the hopper 84, are oscillated both laterally and longitudinally of the machine in order to shake the splints quickly into position, and this movement can be given to the magazine in any approved way, but we have shown the manner in which the work has been done, as this is satisfactory. As illustrated the magazines are moved in a laterally sliding bed 92 (see Figure 12) and the bases 93' slide on the bed 92 but at right angles to the movement of the bed, the members 93' sliding in tracks 94 as shown in Figures 11, 12 and 18. Each magazine is formed of a couple of trays 95 arranged end to end, but one or more trays can be used in a machine, as obviously the length of the trays is not important. Each tray 95 is generally rectangular in shape, is open at the top and on one side, and is supported in the bottom by a flange 96 of the holder 97 presently referred to. The tray is divided into numerous vertical compartments by the partitions 98 which are attached to a back plate 98ª, and having a horizontal bottom 98ᵇ (see Figure 18). The partitions 98 are spaced so that the distance between them is less than the length of a match, and therefore when the tray is shaken backward and forward in two directions, the splints being held from escaping quickly assume parallel positions between the partitions. The parts 98, 98ª and 98ᵇ form an inner tray which is provided with a handle 99 projecting outward through corresponding openings 100 in the backs of the trays 95 and holder 97. This holder engages the two end portions, the back and under sides of the trays 95, and one holder is made to engage and support the two trays, the side flanges 101 of the holder fitting nicely against the ends, while the upper portion of the side flanges is formed into spring members 101ª (see Figure 16) which serve to grip the trays. Each tray 95 is provided with a handle 102 by which it can be moved about as desired, and the holder 97 is provided with a handle 103 by which the magazine as a whole can be lifted or moved. Each magazine is also adapted to slide into position opposite the face plate 104 which rises perpendicularly from the sliding bed 93, and which serves to prevent the displacement of the splints in one direction when the magazine is in position in the machine. In Figure 11 we have shown one magazine in position to be filled, while the other has been removed. The magazine is also provided at its ends with longitudinally extending handles 105 which can be dropped into engagement with hooks 106 carried by the bed 93.

If the magazine is to be emptied, it is lifted out of engagement with the hooks 106 and pulled edgewise out of the machine, and as this is done the operator grasps the handle 103 and tilts the magazine so that the splints will not fall out of the front part after the tray has been pulled away from the face plate 104. Either tray 95 can be handled by the handle 97, and each tray is emptied by bringing the front of the tray opposite the place where the splints are to be deposited, and then pushing inward on the handle 99 which carries forward the back plate 98ª, and the splints can be deposited as usual from the holding tray.

Obviously the machine can be driven in any suitable way, and the magazine can be shaken in any convenient manner, but as illustrated the driving shaft 77 (see Figure 11) is provided with a worm gear 107 connecting through gears 108, 109 and 110 with the shaft 111, and this through the gears 112—113 (see Figure 9) drives the last set of stock feed rolls. The shaft 77 (see Figure 11) also drives through gears 114 and 115 the vertical shaft 116 which connects by gears 117—118 with the shaft 61, and through this with the shaft 36 already referred to. The gearing driven from the shaft 77 is substantially included in the casing 119.

The shaft 77 also connects by gears 120 and 121 with a vertical shaft 122, and this through gears 123—124 (see Figure 12) drives the countershaft 125 arranged below the bed of the table 91. The shaft 125 has an eccentric 126 thereon (see Figure 11) and this through the link or pitman 127 connects with the arm 128 on the under side of the bed 92, thereby serving to shake the bed. The shaft 125 is also geared as shown at 129 to a transverse shaft 130 which carries a heart shaped cam 131 having a similarly shaped groove 132 in which runs the roller 133 on the lever 134, this being pivoted to a bracket 135 and connecting at its free end with a link 136. The latter is pivoted loosely in a boss or arm 137 (see Figure 12) and has at its free end a pin 138 adapted to engage a hook 139 on the bell crank lever 140 which is pivoted at its elbow 141, and has its upper arm pivoted to a link 142 which extends along the face of the plate 104 through the keeper 143, and terminates in a hook 144 extending around the front end of the magazine 85. It will be seen that as the cam wheel 131 revolves, it will oscillate the lever 134 and bell crank 140, slide the plate 93' backward and forward, thus carrying the magazine 85 with it, and when the magazine is to be pulled out and released, or the driving connection broken, the rod or link 142 is pulled forward, thus tilting the bell crank 140 and breaking the connection between the bell crank and the link 136. It will be seen that in the form of magazine and shaking mechanism described, the splints will be quickly straightened and easily handled, and it will also be understood that the particular form of tray and mechanism can be departed from without affecting the invention.

From the foregoing description it will be seen that with the machine described the various processes usually employed in the cutting of splints from green veneer are done away with, or more correctly speaking, combined so that the stock passes through the machine without handling except to insert it, that it is impregnated, dried, cut into splints, and these arranged for packing. It will be further seen that in this machine as described there is no chance for loss due to separate handling operations of the formed splints.

In the foregoing description we have referred to a machine for cutting veneer strips into match splints, and this is the use to which it has been put, but it will of course be understood that the machine may be used for cutting paper or other suitable sheet stock into sticks, as well as for cutting veneer.

Attention is called to the fact that in handling veneer in the sheet, impregnating it in the sheet, and rolling it in the sheet through the feed rollers as described, the stock is virtually ironed or mangled, and during part of the time it is damp, with the result that the fibers are straightened, the stock is condensed, the surface is made smooth so that a much better looking match stick is made than by the ordinary process, and further, by reason of the condensation and smoothing, we get a better match stick than by the ordinary method. By this process too, because of the smoothing and condensing of the fibers, we can use stock which would be too poor to make good splints if they were made in the ordinary way.

We claim:—

1. A machine for cutting wood veneers into match splints, comprising an impregnating bath, means for guiding the stock through the bath at an angle which will prevent breaking the stock, a drier for drying the veneer stock in the strip, a cutter for cutting the stock transversely into individual match splints, a magazine to receive the splints direct from the cutter, and means for feeding the stock uninterruptedly through and to the aforesaid elements.

2. A match splint machine for cutting wood veneers into splints, comprising impregnating means to impregnate the stock in the sheet, a drier behind the impregnating means, a splint cutter to cut the stock transversely into individual splints, and means for uninterruptedly feeding the veneer strips through the impregnating means and drier to the splint cutter.

3. A match splint machine for cutting wood veneers into splints, comprising an impregnating tank, means for guiding the veneer strips end to end through the impregnating tank, a drier for drying the strips, a splint cutter for severing the stock into individual splints, and means for uninterruptedly feeding the stock through the impregnating tank and drier to the splint cutter.

4. A machine for cutting wood veneers into match splints, comprising an impregnating tank, a drier behind the tank, a splint cutter behind the drier, means for guiding the veneer strips flatwise and without twisting through the tank and over the drier, and means for continuously feeding the sheet stock through the tank and drier to the splint cutter.

5. A machine for cutting wood veneers into match splints comprising an impregnating tank, a drier behind the tank, a splint cutter behind the drier arranged to cut the stock transversely into individual splints, means for holding the stock submerged as it passes through the tank, and means for guiding the stock without twisting and at an angle which will prevent its breaking through the tank and drier, and means for uninterruptedly feeding the stock.

6. A machine for cutting wood veneers into match splints comprising an impregnating tank having guide tracks therein arranged to guide the sheet stock and hold it submerged at an angle which will prevent its breaking, a drier behind the tank, a splint cutter for cutting the stock into individual splints, and means for feeding the stock without twisting through the tank and drier to the splint cutter.

7. A match splint machine comprising means for squaring the stock edge, an impregnating tank behind the squaring device, a drier behind the impregnating tank, a splint cutter, and means for feeding sheet stock through the edge squarer, the tank, and drier to the splint cutter.

8. A match splint cutter comprising a cut-off device to square the edge of the stock, an impregnating tank behind the cut-off device, a drier behind the impregnating tank, a match splint cutter behind the drier, and means for feeding sheet stock beneath the cut-off device and through the impregnating tank and drier to the splint cutter.

9. A machine for cutting wood veneers into match splints comprising an impregnating tank, a drier behind the tank, a splint cutter behind the drier, means for feeding the sheet veneer strips through the tank and drier in untwisted condition and at an angle which will prevent the stock from breaking, and wringing rollers located between the tank and drier and between which the stock passes.

10. A machine for cutting wood veneers into match splints comprising an impregnating tank, a pan in the tank arranged to overflow into the tank, circulation pipes delivering from the tank to the pan, means for circulating liquid through said pipes, means for carrying stock through the pan and tank without material bending, means for drying the stock after it leaves the tank, and means for cutting the stock into match splints.

11. In a machine for cutting wood veneers, the impregnating bath comprising a tank, a pan supported in and overflowing into the tank, means for carrying the veneer stock without substantial bending through the tank and pan, and means for circulating liquid from tank to pan.

12. A machine for cutting wood veneers into match splints, comprising an impregnating tank, a drier behind the tank, a splint cutter behind the drier, means for feeding the stock through the impregnating tank without substantial bending, wringing rollers between the tank and drier between which the stock passes, and means for returning to the tank the liquid freed by the wringing rollers.

13. A machine for cutting sheet stock into match splints comprising an impregnating tank, a drier behind the tank, a splint cutter behind the drier, means for feeding the stock to and through the above elements, and means for slitting the stock longitudinally during its passage through the machine.

14. A machine for cuttting sheet stock into match splints, comprising an impregnating tank, a drier behind the tank, a splint cutter behind the drier, and a stock buffer between the drier and the splint cutter.

15. A machine for cutting sheet stock into match splints, comprising an impregnating tank, a drier behind the tank having a heated bed and independent flues and blowers discharging at different points upon the stock, a splint cutter behind the drier, and means for feeding the stock flatwise to and through the aforesaid elements.

16. A machine for cutting wood veneers into individual match splints comprising an impregnating tank, a drier behind the tank, a splint cutter behind the drier to cut the strips transversely into individual splints, means for feeding the veneer strips through the impregnating tank and drier to the splint cutter, a splint magazine arranged to receive the splints direct from the cutter, and means for straightening the splints in the magazine.

17. A machine for cutting wood veneer strips into individual match sticks, comprising an impregnating tank, a drier behind the tank, a splint cutter to cut the stock transversely into individual splints, means for forcing sheet stock flatwise through the impregnating tank and drier to the cutter, a splint receiving magazine into which the splints are delivered from the cutter, and means for shaking the magazine in two directions to straighten the splints.

18. A machine for cutting wood veneers into individual match splints comprising an impregnating tank, a drier behind the tank, a splint cutter having reciprocating knives, means for feeding the veneer stock flatwise through the tank and drier to the splint cutter, a magazine below the cutter into which the severed splints are delivered, and means for straightening the splints as they are delivered in the magazine.

19. A machine for cutting wood veneer strips of a width corresponding to the length of the match splints into individual splints comprising the following instrumentalities arranged one behind the other; means for squaring the stock ends; a shallow impregnating bath; means for guiding veneer stock flatwise through the bath; a stock drier open to the air and arranged behind the bath; a cutter for cutting the stock into individual splints; a magazine to receive the cut splints; means for guiding the cut splints in parallel relation to the magazine, and means for feeding the stock continuously through the foregoing instrumentalities.

In testimony whereof, we have signed our names to this specification this 6th day of January, 1926.

SAMUEL M. FRIEDE.
CHARLES HAKEMEYER.